United States Patent Office 3,505,233
Patented Apr. 7, 1970

3,505,233
CHLOROPENTAFLUOROETHANE-PENTAFLUORO-
ETHANE AZEOTROPIC COMPOSITIONS
Jared W. Clark and Charles E. Rectenwald, Charleston, W. Va., assignors to Union Carbide Corporation, New York, N.Y., a corporation of New York
No Drawing. Continuation-in-part of abandoned application Ser. No. 590,203, Oct. 28, 1966. This application Nov. 12, 1968, Ser. No. 775,206
Int. Cl. C09k 3/02
U.S. Cl. 252—67　　　　　　　　　　　　　3 Claims

ABSTRACT OF THE DISCLOSURE

Chloropentafluoroethane in combination with pentafluoroethane form azeotropes useful as refrigerant compositions.

---

The present application is a continuation-in-part of Ser. No. 590,203 filed Oct. 28, 1966, and now abandoned.

This invention relates to a refrigerant composition and is particularly related to an azeotropic composition of pentafluoroethane and chloropentafluoroethane which is used as a refrigerant.

The mixed fluorine and chlorine derivatives of methane and ethane have attained widespread use in the field of refrigeration as a result of their chemical inertness, their low specific volume, and the wide range of boiling point which is available in the various members of the series. Difluorodichloromethane (B.P. −29.8° C.), fluorotrichloromethane (B.P. 23.7° C.), fluorodichloromethane (B.P. 8.9° C.), monochlorodifluoromethane (B.P. −40.8° C.), and tetrafluorodichloroethane (B.P. 3.5° C.) are among the most commonly used compounds of this type.

When apparatus designed to employ a particular refrigerant has been installed, the need sometimes arises for greater refrigerating capacity. This may be obtained by the use of a refrigerant having a lower boiling point and consequently a higher vapor pressure at a temperature attained by the gas prior to its being compressed and liquefied. The capacity of any given refrigeration compressor is roughly proportional to the pressure of the gas at the suction side of the compressor, since the compressor can handle a fixed volume of gas for a period of time an increase in the suction pressure means an increase in the amount (in pounds) of gas put through the compressor in a given time. An increase in the amount of gas means an increase in the total quantity of heat required to vaporize the liquid in the evaporator, and an increase in the amount of heat that is removed from the refrigerated space.

It is therefore an object of this invention to provide a novel azeotropic composition. Another object is to provide an azeotropic composition which is low boiling and which is effective to provide an increased refrigerating capacity. It is another object of this invention to provide a new composition of matter and to thereby advance the art.

The above and other objects may be accomplished according to this invention which comprises a novel azeotropic composition which consists of a mixture of about 21 weight percent chloropentafluoroethane and about 79 weight percent pentafluoroethane, having a boiling point of −48° C. at 760 millimeters of mercury pressure. The low boiling point of this azeotropic mixture makes it an effective refrigerant for application in refrigerating systems.

It has been found that when chloropentafluoroethane and pentafluoroethane are admixed in the above ratios they form an azeotrope which distills at constant temperature, the liquid phase and the vapor phase in equilibrium therewith having the same composition. Such mixture is nonflammable and nontoxic in both the liquid phase and the vapor phase and it is useful as a refrigerant.

The azeotropic composition of this invention was obtained in the course of a distillation of a mixture of 68.6 weight percent pentafluoroethane and 31.4 weight percent chloropentafluoroethane. Approximately 66 grams of this mixture was charged to a laboratory distillation still equipped with ½″ x 42″ vacuum jacketed column filled with stainless steel protruded packing in a condenser cooled with a mixture of Dry Ice and acetone. Provision was made for removing the overhead vapor for analysis. The mixture was heated to its boiling point and a total reflux for about 30 minutes before removing samples for gas chromatographic analysis. An azeotrope was removed at −48° C. and at 1 atmosphere pressure which consisted of 21 weight percent chloropentafluoroethane and 79 weight percent pentafluoroethane.

The azeotropic composition of this invention may be used in domestic or commercial refrigerators and freezers, industrial cooling systems and air-conditioning units, or in any other systems in which cooling is effected by the evaporation and expansion of liquid refrigerant.

The azeotropes of this invention are unexpected in view of the fact that the following fluorinated compounds in Table I do not form azeotropes with chloropentafluoroethane:

Table I

Fluorinated compounds or mixtures that do not form azeotropes with chloropentafluoroethane (1) Dichlorodifluoromethane
(2) 1,1,1,2,2-pentafluoropropane
(3) mixtures of dichlorodifluoromethane and monochlorodifluoromethane
(4) mixtures of monochlorodifluoroethane and 1,1-difluoroethane
(5) mixtures of monochlorodifluoroethane and perfluoropropane.

Because the azeotropes of the invention are obtained over a range of pressures from below atmospheric to above atmospheric pressure the composition of each of the constant boiling mixtures obtained over this range of pressures will vary even though at each fixed pressure the azeotrope will remain as a constant boiling mixture having fixed ratios of components. Thus at 770 mm. Hg pressure an azeotrope will be obtained, the components of which will be in a fixed ratio and the mixture will have a constant boiling point; but at 760 mm. Hg pressure the mixture will change so that the ratio of one component to the other will be different as compared to that obtained at the higher pressure even though at the lower pressure the ratios of components is fixed and such mixtures have a constant boiling point. For these reasons the azeotrope of this invention will have a composition comprising about 21 parts by weight of chloropentafluoroethane ± about 15% especially ± about 5% and about 79 parts by weight of pentafluoroethane ± about 15% especially ± about 5%. These ranges thus for example would relate to compounds having about 21 parts by weight ± about 15% or stated otherwise ± about 3.15 parts by weight which would include a range from about 17.85 parts to about 24.15 parts chloropentafluoroethane on a weight basis and the like for the other ranges of components noted above.

Although the invention has been described by reference to some preferred embodiment, it is not intended that the novel azeotropes be limited thereby but that certain obvious modifications are intended to be included within the broad scope and spirit of the following claims.

What is claimed is:

1. An azeotropic composition consisting essentially of about 17.85 to about 24.15 parts by weight of chloropentafluorethane and about 67.15 to about 90.85 parts by weight pentafluoroethane.

2. An azeotropic composition consisting essentially of about 19.5 to about 22.5 parts by weight of chloropentafluoroethane and about 75.05 to about 82.95 parts by weight of pentafluoroethane.

3. An azeotropic composition consisting of abuot 21 weight percent chloropentafluoroethane and 79 weight percent pentafluoroethane boiling at −48° C. and 760 millimeters of mercury pressure.

References Cited

UNITED STATES PATENTS 3,377,287   4/1968   Kvalnes et al.

LEON D. ROSDOL, Primary Examiner

I. GLUCK, Assistant Examiner

U.S. Cl. X.R.

62—112; 252—68, 69, 162